United States Patent [19]

Richard

[11] 3,969,096
[45] July 13, 1976

[54] CYCLONE SEPARATOR HAVING MULTIPLE-VANED GAS INLETS

[75] Inventor: Paul Herbert Richard, Wilmington, Del.

[73] Assignee: E. I. Du Pont de Nemours and Company, Wilmington, Del.

[22] Filed: Oct. 16, 1974

[21] Appl. No.: 515,242

[52] U.S. Cl. ............................ 55/455; 55/DIG. 30; 60/311
[51] Int. Cl.² ..................... B01D 45/12; B04C 5/04
[58] Field of Search ............ 55/419, 449, 455, 456, 55/457, 459, DIG. 30; 209/144; 210/512 R; 60/311

[56] References Cited
UNITED STATES PATENTS

| | | | |
|---|---|---|---|
| 870,383 | 11/1907 | Pool | 55/419 X |
| 1,539,797 | 5/1925 | Chandler et al. | 55/449 |
| 1,897,195 | 2/1933 | Howden | 209/144 |
| 1,923,515 | 8/1933 | Stull | 55/419 X |
| 2,405,625 | 8/1946 | Whiton et al. | 55/449 X |
| 2,929,465 | 3/1960 | Campbell | 55/419 |
| 3,253,400 | 5/1966 | Hass | 60/30 |
| 3,370,408 | 2/1968 | Lehrer et al. | 55/457 X |
| 3,485,593 | 12/1969 | Lenane et al. | 55/456 UX |
| 3,688,476 | 9/1972 | Lenane | 55/276 |
| 3,815,337 | 6/1974 | Lenane | 55/459 X |
| 3,920,426 | 11/1975 | Tu et al. | 55/455 X |

FOREIGN PATENTS OR APPLICATIONS

| | | | |
|---|---|---|---|
| 756,646 | 6/1953 | Germany | 55/419 |
| 727,376 | 3/1955 | United Kingdom | 55/449 |

OTHER PUBLICATIONS

Lapple, C. E., *Fluid and Particle Mechanics*, University of Delaware, 1951, pp. 305–309.
Perry, J. H., *Chemical Engineers' Handbook*, N.Y., McGraw–Hill, 1950, pp. 1023–1028.

*Primary Examiner*—Frank W. Lutter
*Assistant Examiner*—Kathleen J. Prunner
*Attorney, Agent, or Firm*—James A Costello

[57] ABSTRACT

A cyclone separator having multiple-vaned gas inlets adapted to guide the gas flow into the interior of the cyclone separator. The total sum of the inlet areas is at least equal to the smallest internal flow area and the cyclone is useful for separating suspended solid particles from internal combustion engine exhaust gases.

1 Claim, 7 Drawing Figures

CYCLONE SEPARATOR HAVING MULTIPLE-VANED GAS INLETS

BACKGROUND OF THE INVENTION

This invention concerns a cyclone separator having multiple-vaned gas inlets. Although cyclone separators are known for removing suspended solids from gases, the cyclone separator of the design described herein is not known. Some typical cyclone separator designs are shown in the Third Edition of Perry's Chemical Engineers' Handbook (1950) published by McGraw-Hill Book Co., New York City.

Cyclone separators have been proposed for use in engine exhaust gas traps to remove solid particles, especially lead-containing particles from the exhaust gas. For adequate removal of the lead particles by art-known cyclone separators, the gas pressure at their gas inlets must be substantially greater than at their outlets putting a greater demand on an engine with a resulting loss in fuel economy and power. Furthermore, cyclone separators operating at high pressure drops are known to have poor particle collection efficiency per unit pressure drop.

In automotive use, traps that contain cyclone separators are normally mounted on the vehicle underside. Since art-known cyclone separators require a large amount of space to accommodate their gas inlets, traps containing them are bulky and complicate the engineering design problem of allowing adequate road clearance.

Cyclone separators are known in the art to be useful for separating suspended solid particles from an exhaust gas, said separators comprising i. a cylindrical first shell having an open first end and a second end closed except for an opening designed to accommodate a gas outlet tube; said shell having a gas inlet in its periphery near its second end, said shell having a gas outlet tube sealably mounted in the opening in the second end of the shell, said outlet tube being coaxial with the shell, extending into the shell past the gas inlet, and separated from the gas inlet; and ii. a second shell, cylindrical or conical in shape, having two open ends, the first open end sealably engaging, communicating with, and coextensive with the open first end of the cylindrical first shell, and the second open end being a solids discharge opening located beyond the end of the gas outlet tube that extends into the cylindrical first shell, in the direction away from the closed end of the cylindrical first shell.

SUMMARY OF THE INVENTION

This invention now provides an improved cyclone separator that operates at a relatively low pressure drop with good collection efficiency. The improved cyclone separator is more effective than prior art separators based on a higher quotient of collection efficiency divided by pressure drop. Thereby, an automobile engine using the improved cyclone separator can operate at a lower exhaust gas pressure drop than one using a prior art cyclone separator. Improved engine performance and gas mileage are the normally expected results of such an advantage.

The cyclone separator of this invention avoids scrubbing of the gas outlet tube by the incoming exhaust gases. Thus, there is no eddy formation to slow spiral velocity and centrifugal action of the exhaust gases. The improved cyclone separator is also characterized by having a total gas inlet area at least as large as the smallest internal flow area. It is noted that the cyclone separator of this invention would be useful also in chimneys, say, to remove fly ash.

The improved cyclone separator for separating suspended solid particles from a gas, comprises i. a cylindrical first shell having an open first end and a second end closed except for an opening designed to accommodate a gas outlet tube; said shell having a gas inlet in its periphery near its second end, said shell having a gas outlet tube sealably mounted in the opening in the second end of the shell, said outlet tube being coaxial with the shell, extending into the shell past the gas inlet, and separated from the gas inlet; and ii. a second shell of circular periphery having two open ends, the first open end sealably engaging, communicating with, and coextensive with the open first end of the cylindrical first shell, and the second open end being a solids discharge opening located beyond the end of the gas outlet tube that extends into the cylindrical shell, in the direction away from the closed end of the cylindrical shell; wherein the improvement comprises iii. the gas inlet consisting of from 3 to about 30 elongated inlet openings (like the openings in a louver) located in the periphery of the cylindrical shell, and disposed axially therein, each opening having a guide vane (like the vanes in a louver) positioned to deflect incoming gas in a circular path from the gas outlet tube.

A preferred cyclone separator of this invention will have guide vanes all of the same length and all of the same axial orientation. In said preferred cyclone separator there will be a ratio of average inlet opening depth to the radial distance between the outlet tube and the cylindrical first shell, of 0.1 to 0.7, preferably 0.15 to 0.3. The product of said ratio times the number of inlet openings is in the range of 1 to 4.5, preferably 1.5 to 3. These ratios are significant to indicate the relationship of the total inlet area to the internal flow area as measured by the product of the clearance distance times vane length.

The following definitions will aid in understanding this invention. By "total inlet area" is meant average inlet opening depth times the average length of the openings times the number of openings. By "internal flow area" is meant the clearance distance between the trailing, in a gas flow sense, edge of the longest vane and the gas outlet tube times the axial distance traversed by vanes. Where the vanes are all of the same length, the internal flow area is the clearance distance between any vane and the gas outlet tube times the axial distance traversed by vanes. By inlet opening depth is meant the shortest distance between the surface of one vane and the surface of another vane or structure, which surfaces restrict gas flow into the cyclone separator. See, for instance, FIG. 2 and the discussion thereof concerning item 16A. Generally, the inlet opening depth will remain fairly constant over the entire length of a vaned opening. However, inlet opening depths may vary somewhat from one vaned opening to another.

The cyclone separator of this invention preferably will have 8 to 16 openings. The contemplated cyclone separator of the invention can have guide vanes wholly outside the cylindrical shell periphery, wholly inside, or outside extending inside. The contemplated shape of second shells (which have a circular periphery) is a cylindrical shell, or a conical shell having its large end coextensive with the end of the cylindrical first shell.

Although it cannot be proven why the improved cyclone separator has good efficiency at a low pressure drop, it is hypothesized that the inlet vanes guide the incoming gas into the cyclone separator in sheetlike streams close to the inner wall of the shell. Solids in these streams have a head start on centrifugal separation. It is further believed that such sheets of inlet streams, which take a spiral path in the cyclone, present a cleaner mass boundary against which the outbound return gas spiral has a reduced tendency to form eddies. Reducing eddy formation decreases the velocity-slowing drag on the inbound stream so that the separating efficiency of the inbound spiral (toward solids collection area) can be expected to increase.

DETAILS OF THE INVENTION

Figure 4:
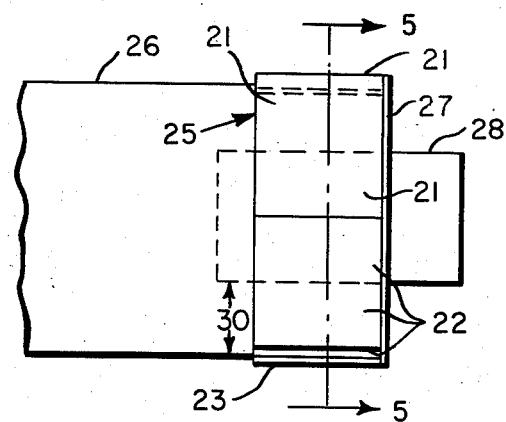
FIG. 4 is an axial view of the multiple-vaned gas inlets of a cyclone separator, in section, of this invention.
Figure 6:
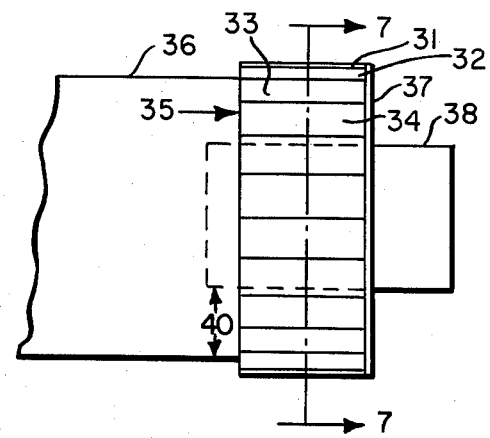
FIG. 6 is an axial view of the vaned gas inlets of a cyclone separator of this invention.

The longest vane dimension is generally the same length as the opening whose gas inflow it serves to guide. FIGS. 4 and 6 show the individual vanes traversing the full length of the corresponding openings. However, for the sake of a better perspective view, in FIGS. 1 and 2 the vanes are shown as somewhat narrower than the corresponding openings.

Figure 1:
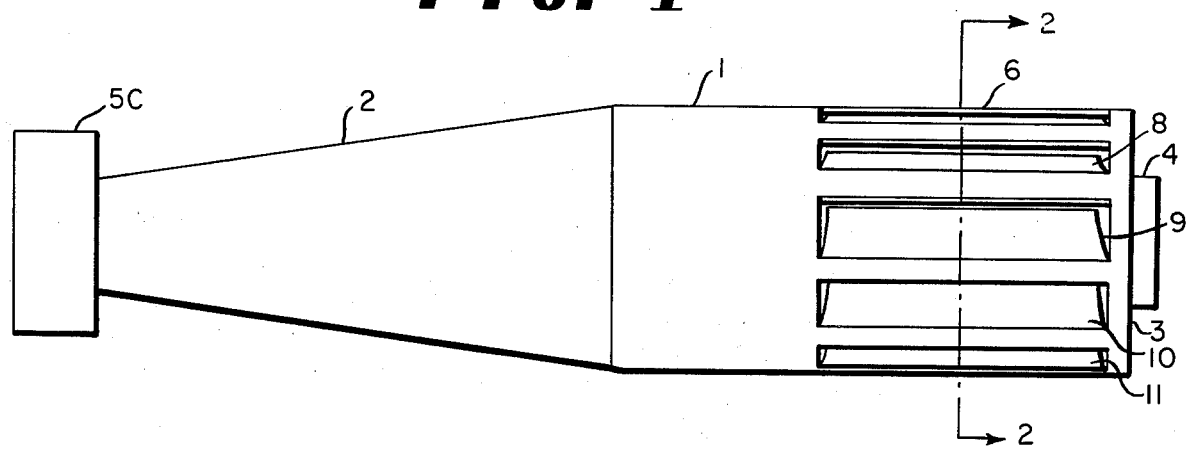
FIG. 1 is an outside axial view of a cyclone separator of this invention.
Figure 3:
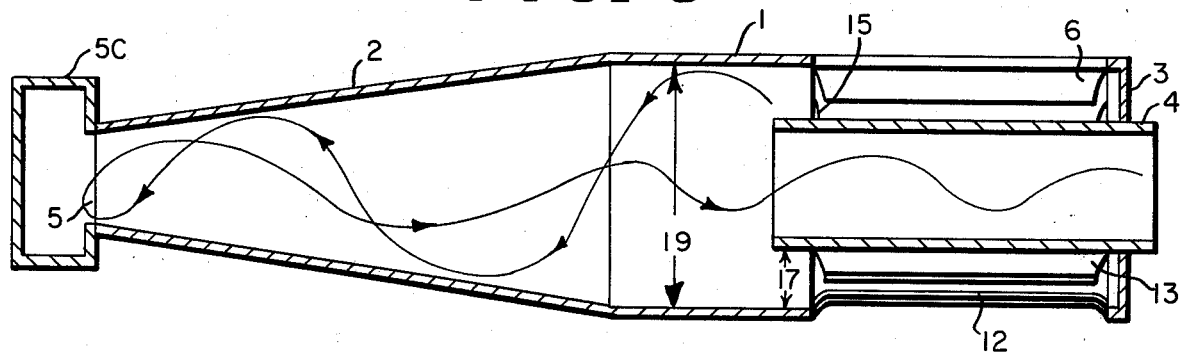
FIG. 3 is a cross-sectional view of FIG. 1 aligned with a view along line 3—3 of FIG. 2.
Figure 2:
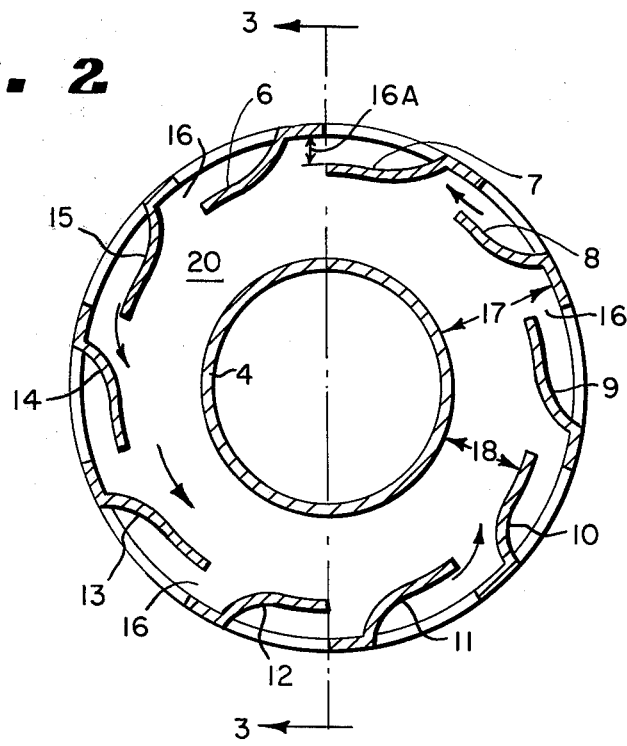
FIG. 2 is a view through section 2—2 of FIG. 1.

In FIG. 1 and related FIGS. 2 and 3, the cyclone separator comprises cylindrical first shell 1 sealably united at its open end to conical second shell 2. Shell 1 has closure 3 holding gas outlet tube 4 which is coaxial with shell 1, sealably mounted in closure 3, and in communication with shell 2. Shell 2 has opening 5 in communication with tube 4.

Shell 1 has ten louvers 6 to 15, the louvers being of the same length and axial orientation. Each louver has an opening 16 and provides an inlet area which is the product of its average opening depth 16A, times the length of its opening along the axis. The radial clearance distance 17 between tube 4 and shell 1 is also shown in FIG. 2. Each louver has clearance distance 18 between it and tube 4. Tube 4 extends into shell 1 a distance past louvers 6 to 15. Clearance space 20 provides an internal flow area which is the product of clearance distance 18 times the length of the louvers 6 to 15. Opening 5 in shell 2 communicates with solids collection chamber 5C which is otherwise closed.

An improved cyclone separator of this invention operates in the following manner. When a gas containing dispersed solids is supplied to a zone surrounding louvers 6 to 15 at a higher pressure than at the exit of tube 4 the gas flows into shell 1 through louver openings 16 each of depth 16A. Flow is directed by louvers 6 to 15 into clearance space 20 in the circular direction shown by the flow arrow of FIG. 2. As the flow circles around tube 4 it becomes a spiral flow and spirals toward opening hole 5 under the influence of continued gas inflow. Solids in the gas are deposited centrifugally into chamber 5C. The spiral flow then reverses axially and exits through tube 4.

Figure 5:
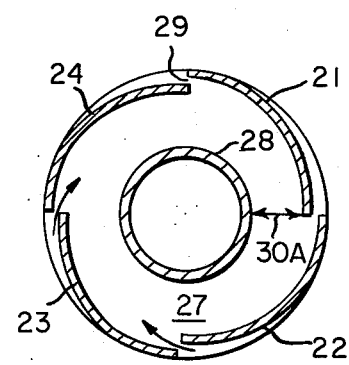
FIG. 5 is a view through section 5—5 of FIG. 4.

FIGS. 4 and 5 show a cyclone separator having four inlet vanes 21 to 24 mounted in a circular frame 25 having end plate 27. The vanes extend inside and outside cylindrical shell 26. The circular frame is coaxially united with shell 26 and supports (by end plate 27) gas outlet tube 28 in concentric alignment with shell 26. Adjacent pairs of vanes 21 to 24 have a vane inlet opening depth 29 between them at their closest spacing from each other. The radial clearance distance 30 is the distance between tube 28 and shell 26. The radial clearance distance 30A is the distance between tube 28 and vane 21 trailing edge.

Figure 7:
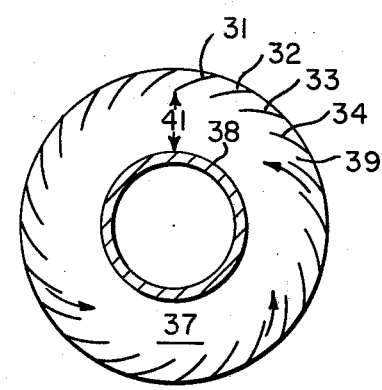
FIG. 7 is a view through section 7—7 of FIG. 6.

The cyclone separator shown in FIGS. 6 and 7 has 24 inlet vanes, typified by vanes 31 to 34, mounted in circular frame 35 having end plate 37. Vanes 31 to 34 extend between the interior periphery of shell 36 and the exterior of frame 35 which extends outside of the periphery of shell 36. End plate 37 of frame 35 holds gas outlet tube 38 concentrically aligned with shell 36. Adjacent pairs of vanes have a vane inlet opening depth 39 between them at their closest spacing from each other. The radial clearance distance 40 is the distance between tube 38 and shell 36. The radial clearance distance 41 is between tube 38 and vane 31 trailing edge.

As will be obvious to one skilled in the art from the description presented herein, the cylindrical first shell and the second shell of circular periphery are sealed together to form one integrated unit of smooth interior surface, having the characteristics ascribed to the improved cyclone separator. In this integrated unit, the gas inlet area extends between the farthest points toward and away from the solids discharge opening at which exhaust gas enters the cyclone separator. The gas outlet tube normally extends into the circular shell an axial distance at least as far as the inlet area extends. The gas outlet tube has as large a diameter as is practical, so as to maintain a high effectiveness criterion defined as collection efficiency divided by pressure drop. Preferably, it extends beyond the inlet area ⅛, but not more than ⅝ times the diameter of the cylindrical first shell. The cylindrical first shell is long enough to accommodate the gas inlet area. The second shell extends beyond the gas outlet tube.

The preferred cyclone separator of this invention, having a cylindrical shell of diameter D, can have a length of 0.75 D to 2 D, preferably 2 D. It's conical portion can be 1.65 D to 2 D long, preferably 2 D. The diameter of the solids discharge (shown as no. 5 in FIGS. 1–3) can be from 0.4 D to 0.75 D to avoid plugging of the opening by vapor condensation.

The guide vanes are positioned to deflect incoming gas into that outside portion of the clearance space between the radially inner edges of the vanes and the gas outlet tube. Moreover, vane positioning is such that incoming gas is deflected away from the outlet tube, thereby avoiding eddies which might result from scrubbing the tube with gas. In their preferred form, the vanes are positioned to deflect incoming gas into an outer zone of the clearance space surrounding the outlet tube. The multiple elongated openings are preferably disposed, lengthwise, in the direction of the shell axis, but can be up to 45° from the shell axis to alter the axial and radial velocity components of incoming gas for particular applications.

The cyclone separators of this invention have from 3 to about 30 vaned openings, depending on the thickness of materials of construction and the effect of such thickness on the available inlet opening areas. Usually, 4 to 20 openings are employed and 8 to 16 are preferred. These vanes can be inside or outside the circular shell, and they can extend from the outside to the inside of the shell. Vanes that extend inside the shell must not unduly limit the internal flow area.

The improved cyclone separators have a relatively large total inlet area. The total inlet area is the total of every inlet opening area. The inlet area can be up to 5 times the internal flow are and is usually 1 to 4.5, preferably 1.5 to 3, times the internal flow area. Such ranges are easily attained by limiting the ratio of the average inlet opening depth to the radial distance between the outlet tube and cylindrical shell to the range 0.1 to 0.7, preferably 0.15 to 0.3, and by limiting the product of this ratio times the number of inlet openings to the range 1 to 4.5, preferably 1.5 to 3.0.

The following comparison of an invention cyclone separator and a prior art cyclone separator shows the advantages of this invention: Two muffler traps were constructed of 16 gauge Type 304 stainless steel, each 5 inches high, 12 inches wide and 23 inches long, having 2½ inches diameter inlets and outlets. Each trap shell held two cyclone separators for parallel service. In each cyclone, a 7 inches long, 3½ inches diameter (D) cylindrical shell was united at one end with the large end of a 7 inches long conical shell having a 1½ inches diameter solids opening end. An end plate at the other cylindrical shell end had a 1½ inches diameter coaxial tube extending through it.

One set of cyclone separators (set A in trap A) were constructed in accordance with the teaching of this invention as follows. The cylindrical wall of each separator was provided with ten axially extending internally vaned openings. The openings were 4 inches long starting ¼ inch from the end plate. Each guide vane provided an inlet opening depth of 7/32 inches and an inlet area of 0.47 sq. in. The outlet tube extended 4 11/16 inches into the shell (⅛ D past the inlet openings). Each separator was positioned with its axis 2½ inches from the muffler trap top and sides.

The other trap, designated B, employed prior art cyclone separators (set B) constructed as set A was constructed with the exceptions which follow. The cylindrical shell of each cyclone was provided at its gas outlet end with a conventional single rectangular tangential entry duct extending 1⅞ inches along the shell axis from the end plate. The duct was 15/16 inches wide, extended 3¼ inches from its point of tangency and its 15/16 inch dimension at 2½ inches from tangency was flared to 1½ inches at 3¼ inches from tangency. The outlet tube extended 2 15/16 inches into the shell. Each cyclone in trap B was mounted with its cylindrical shell against the muffler trap top and opposite sides. Their inlet ducts were positioned for tangential gas entry.

Each trap was subjected to a number of varied air flows against atmospheric pressure discharge. The data were fitted to the equation, $cfm = K\sqrt{\Delta P}$, where $cfm$ is air flow at standard temperature and pressure, $\Delta P$ is pressure drop and $K$ is a measure of effective flow areas. At a flow of 300 cubic feet per minute, the flow equation yielded pressure drops in inches of mercury of:

Trap A - 5.5 (of the invention)
Trap B - 12 (of the prior art)

From this data one can calculate that the cyclone separators in trap A have 1.48 times the effective flow area of trap B.

These traps were installed in turn on a 1972 Ford V-8 automobile replacing the original muffler. Engine back pressure was measured with a mercury manometer immediately ahead of the muffler or trap inlet. The car was operated on a chassis dynamometer at 4000 rpm, wide-open throttle until the manometer reached an equilibrium condition. The following values were attained:

| Muffler or Trap | Back Pressure, in. Hg. |
|---|---|
| Standard Ford Muffler (no trap) | 14.1 |
| Trap A | 17.8 |
| Trap B | 26.5 |

As can be seen, invention trap A gave only a small increase in pressure drop over the conventional muffler whereas trap B gave a great increase in pressure drop. It is obvious that trap B does not allow the development of engine power that trap A does.

Trap A was next installed on the same car and it was operated on a programmed chassis dynamometer using the driving cycle identified in the Federal Register, Vol. 35, No. 219, Nov. 10, 1970. Total filters were attached to the tailpipe for 1500 mile intervals and analyzed for lead. This was done for 6000 miles. Then trap B was installed for a similar test duration of 6000 miles. The traps were similarly alternated for further 6000 mile periods. Based on the lead in the gasoline used, the percentage of total lead emitted from the traps was calculated. The results below show percent lead during 1500 mile intervals and the cumulative average of percent lead at each 1500 mile check point.

| | Lead Emissions, % of Pb Burned | | | |
|---|---|---|---|---|
| | Trap A | | Trap B | |
| Mileage Period | Period Average | Cumulative Average | Period Average | Cumulative Average |
| 0–1,500 | 9.93 | 9.93 | 6.96 | 6.96 |
| 1,500–3,000 | 10.64 | 10.29 | 9.75 | 8.36 |
| 3,000–4,500 | 15.40 | 11.99 | 12.48 | 9.73 |
| 4,500–6,000 | 14.46 | 12.61 | 19.11 | 12.08 |
| 6,000–7,500 | 31.15 | 16.49 | 27.56 | 15.09 |
| 7,500–9,000 | 21.82 | 17.31 | 27.47 | 17.81 |
| 9,000–10,500 | 13.97 | 16.94 | 28.38 | 19.07 |
| 10,500–12,000 | 12.98 | 16.47 | 27.31 | 20.31 |
| 12,000–13,500 | 40.41 | 19.34 | 17.55 | 19.99 |
| 13,500–15,000 | 22.01 | 19.60 | 29.86 | 21.00 |
| 15,000–16,500 | 21.88 | 19.80 | 36.84 | 22.51 |
| 16,500–18,000 | 19.71 | 19.80 | 31.39 | 23.22 |

It is noted that trap A, using invention cyclone separators, is superior to trap B, using prior art cyclone separators. The results also show that emissions through the improved cyclone separators leveled out with mileage accumulation while those through the prior art cyclone separators continued to increase. This favorable performance using invention cyclones is attained despite a lower pressure drop. It is clear that the improved cyclone separators allow better car performance and/or gas mileage than prior art cyclone separators of corresponding size, without loss of trapping performance.

After further comparative operation trap A showed a cumulative average of retained percent of lead burned, approximately equivalent to that of trap B at between 18,000 and 24,000 miles of operation. Nevertheless, lower pressure drop in trap A allows better car performance than possible employing trap B.

The embodiments of the invention in which an exclusive property or privilege is claimed are defined as follows:

1. A cyclone separator for separating suspended solid particles from a gas, comprising
   i. a cylindrical first shell having an open first end and a second end closed except for an opening designed to accommodate a gas outlet tube; said shell haing a gas inlet in its periphery near its second end, said shell having a gas outlet tube sealably mounted in the opening in the second end of the shell, said outlet tube being coaxial with the shell, extending into the shell past the gas inlet, and separated from the gas inlet; and
   ii. a second shell of circular periphery having two open ends, the first open end sealably engaging, communicating with, and coextensive with the open first end of the cylindrical first shell, and the second open end being a solids discharge opening located beyond the end of the gas outlet tube that extends into the cylindrical shell, in the direction away from the closed end of the cylindrical shell; wherein the improvement comprises
   iii. the gas inlet consisting of from 3 to 30 elongated inlet openings circumferentially spaced in the periphery of the cylindrical shell, and disposed axially therein, said inlet openings having a depth which is defined as the shortest distance between the surface of one vane and the surface of another vane, which surfaces restrict gas flow into the separator, each opening having a guide vane positioned to deflect incoming gas away from the gas outlet tube, in a circular path,
   wherein all guide vanes are of the same length and axial orientation,
   wherein each guide vane begins at the shell periphery and extends inside the cylindrical shell periphery, and
   wherein the ratio of inlet opening depth to the radial distance between the outlet tube and the cylindrical shell is in the range 0.1 to 0.7, and the product of this ratio times the number of inlet openings is in the range 1 to 4.5.

* * * * *